Sept. 30, 1930.  L. T. THURBER  1,776,871
APPARATUS FOR SUPPLYING FUEL TO INTERNAL COMBUSTION ENGINES
Filed Oct. 6, 1923  7 Sheets-Sheet 1

INVENTOR
Luman T. Thurber
by Roberts Roberts & Cushman
att'ys

Sept. 30, 1930.  L. T. THURBER  1,776,871
APPARATUS FOR SUPPLYING FUEL TO INTERNAL COMBUSTION ENGINES
Filed Oct. 6, 1923  7 Sheets-Sheet 2

INVENTOR
Luman T. Thurber
by Roberts Roberts & Cushman
Att'ys.

Sept. 30, 1930.  L. T. THURBER  1,776,871
APPARATUS FOR SUPPLYING FUEL TO INTERNAL COMBUSTION ENGINES
Filed Oct. 6, 1923   7 Sheets-Sheet 4

INVENTOR
Luman T Thurber
by Roberts Roberts & Cushman
attys

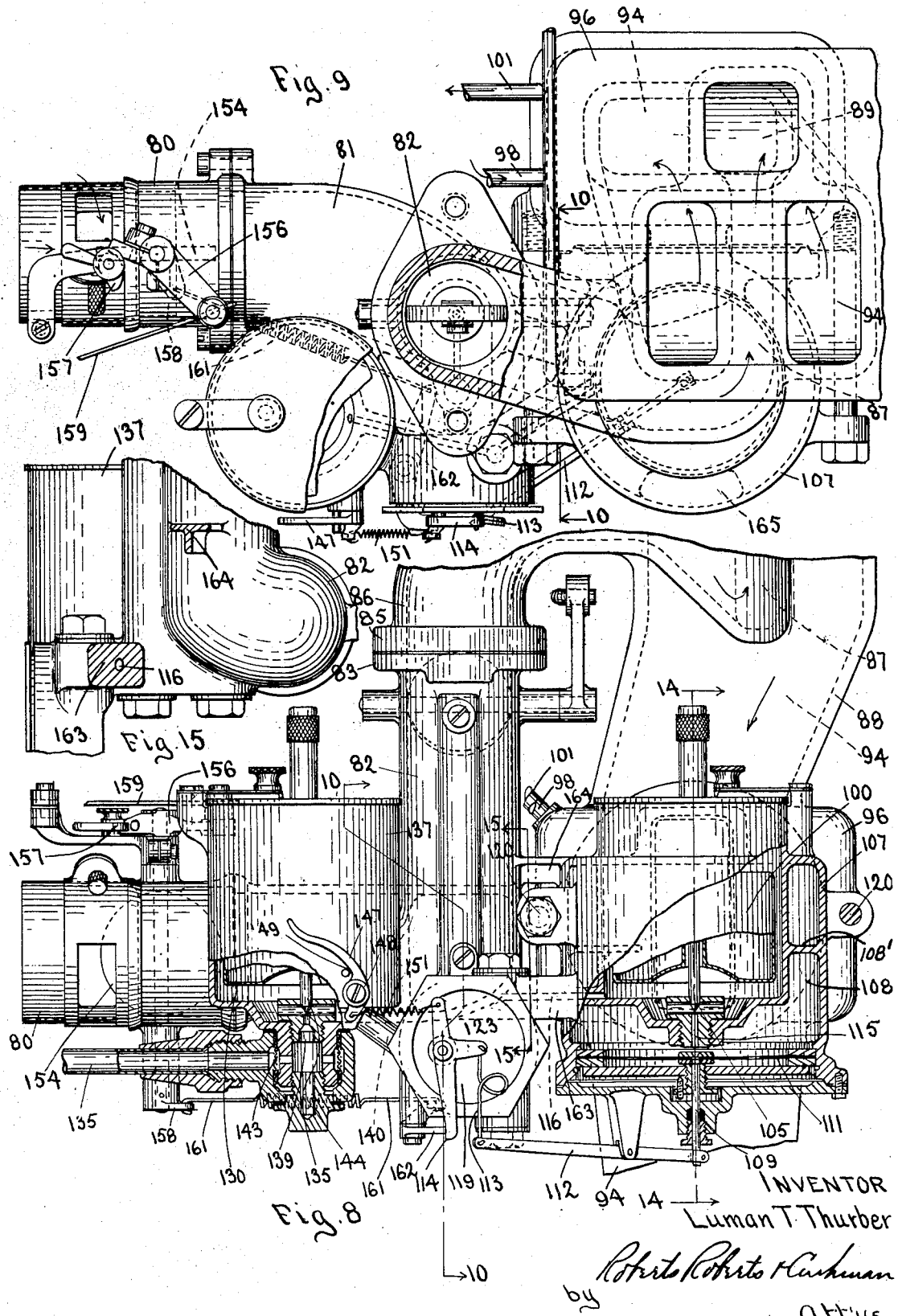

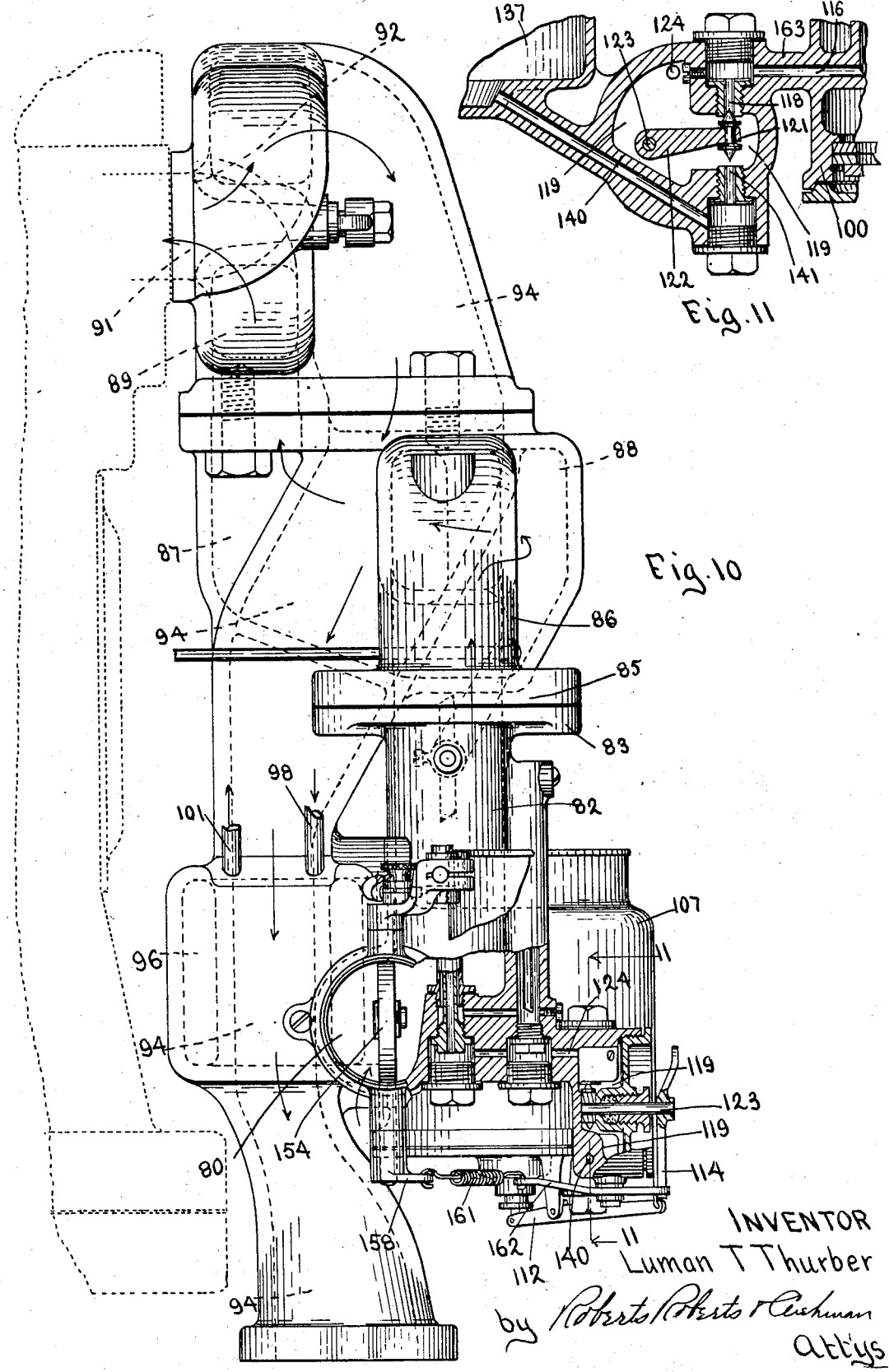

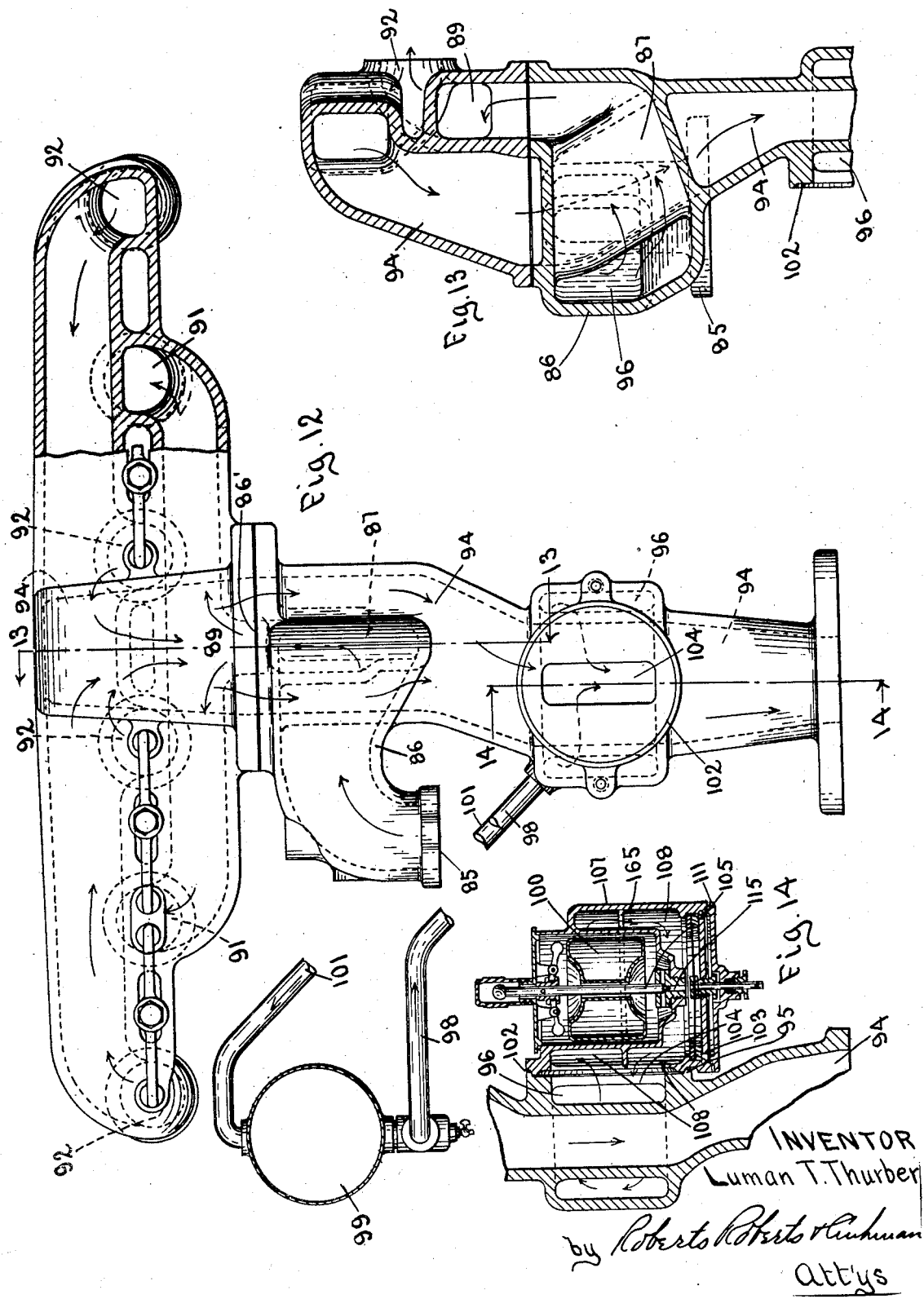

Patented Sept. 30, 1930

1,776,871

UNITED STATES PATENT OFFICE

LUMAN T. THURBER, OF BROOKLINE, MASSACHUSETTS

APPARATUS FOR SUPPLYING FUEL TO INTERNAL-COMBUSTION ENGINES

Application filed October 6, 1923. Serial No. 667,062.

Objects of the invention are selectively to supply kerosene or other relatively heavy fuel and gasoline or other relatively light volatile fuel to an internal combustion engine or other device, to make the selection of fuel automatically responsive to the temperature of the fuel and the condition of the engine, to provide a circuitous path for the heavy fuel whereby the fuel may be continuously circulated past a heater and maintained hot irrespective of the rate at which the fuel is being drawn to the engine, to heat the float-chamber for the heavy fuel, to utilize said circulation of heated fuel to maintain the float-chamber heated, to provide means for manually shifting from one to the other fuel independently of the automatic control, to connect the lighter fuel to the engine independently of the automatic control when the choke is operated in starting the engine, and generally to improve fuel apparatus in which the fuel is preheated.

For the purpose of illustrating the genus of the invention two concrete embodiments are shown in the accompanying drawings in which:—

Fig. 8 is a side elevation of the other embodiment of the invention, parts being broken away to show the feeding and control mechanism for both light and heavy fuel;

Fig. 9 is a plan view of the same, parts being away;

Fig. 10 is an end elevation, parts being sectional on the line 10—10 of Fig. 8;

Fig. 11 is a detail section of the regulatory valve connecting the gasoline and kerosene float-chambers with the mixing chamber;

Fig. 12 is a side elevation of the manifold of the second embodiment with the carbureter and other mechanism removed;

Fig. 13 is a section on the line 13—13 of Fig. 12;

Fig. 14 is a detail section of the kerosene float-chamber on the line 14—14 of Fig. 8; and Fig. 15 is a detail section on the line 15—15 of Fig. 8.

Figure 1:
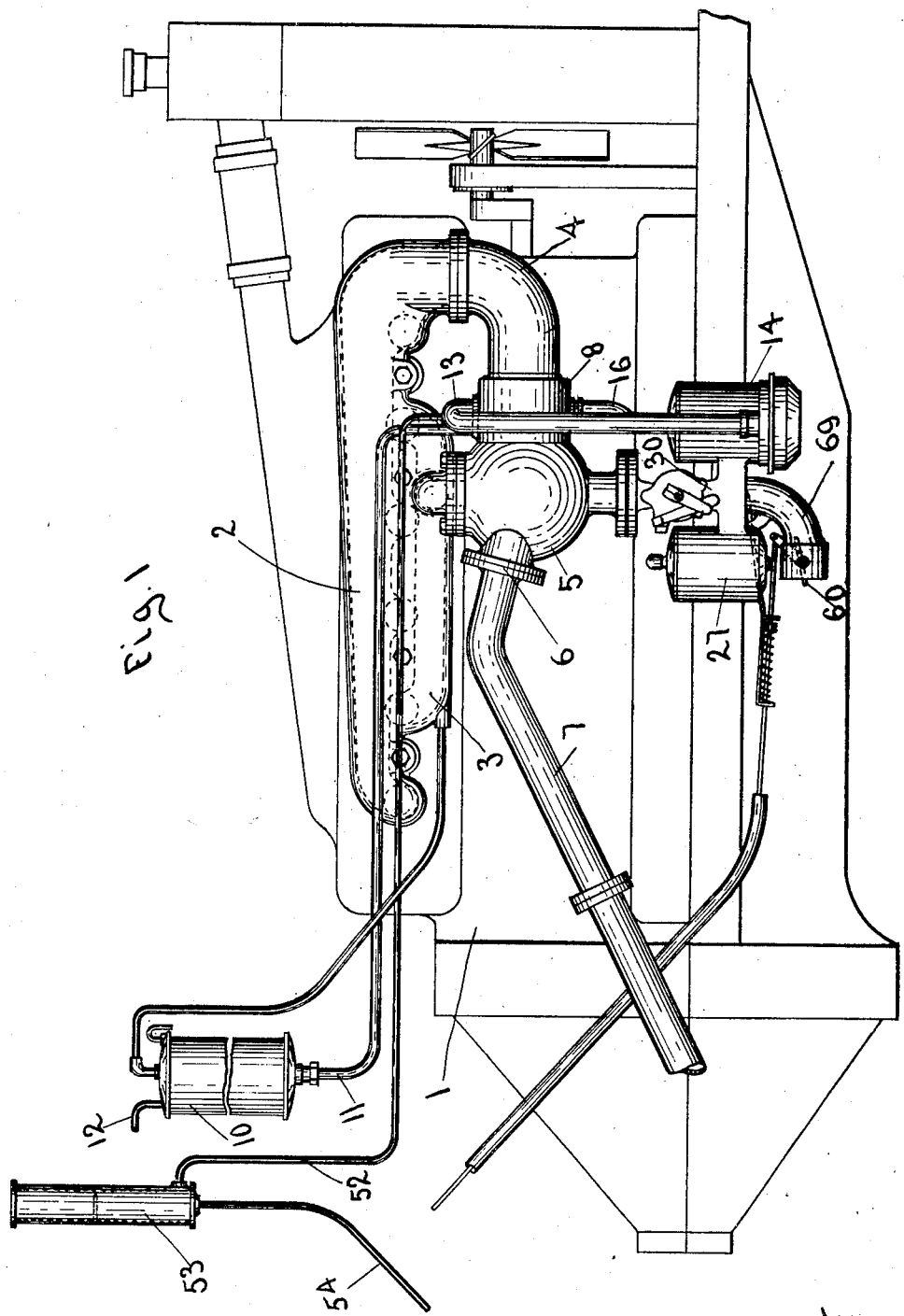
Fig. 1 is a side view of one embodiment applied to an engine.
Figure 2:
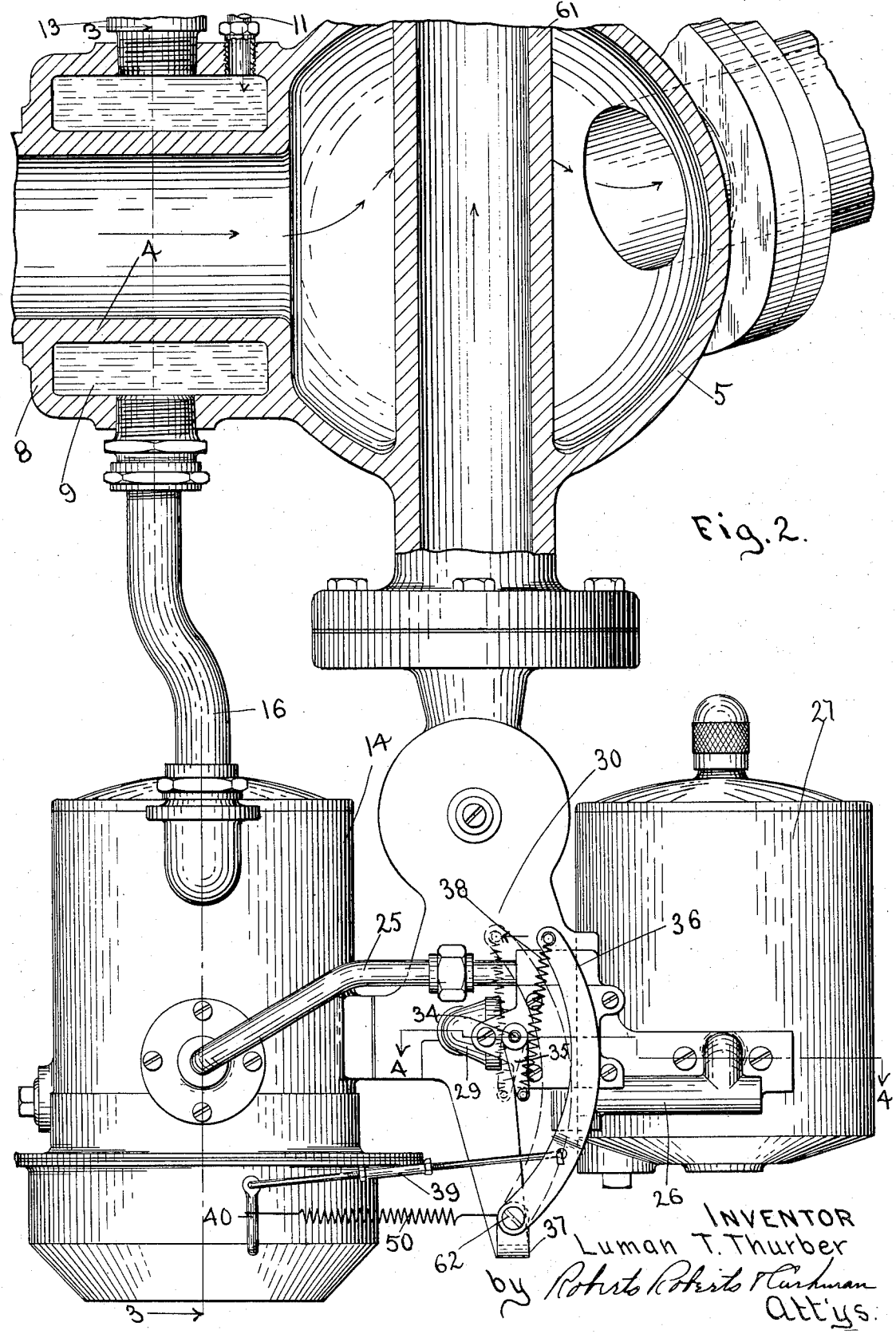
Fig. 2 is an enlarged view from the same side, parts being shown in section.
Figure 3:
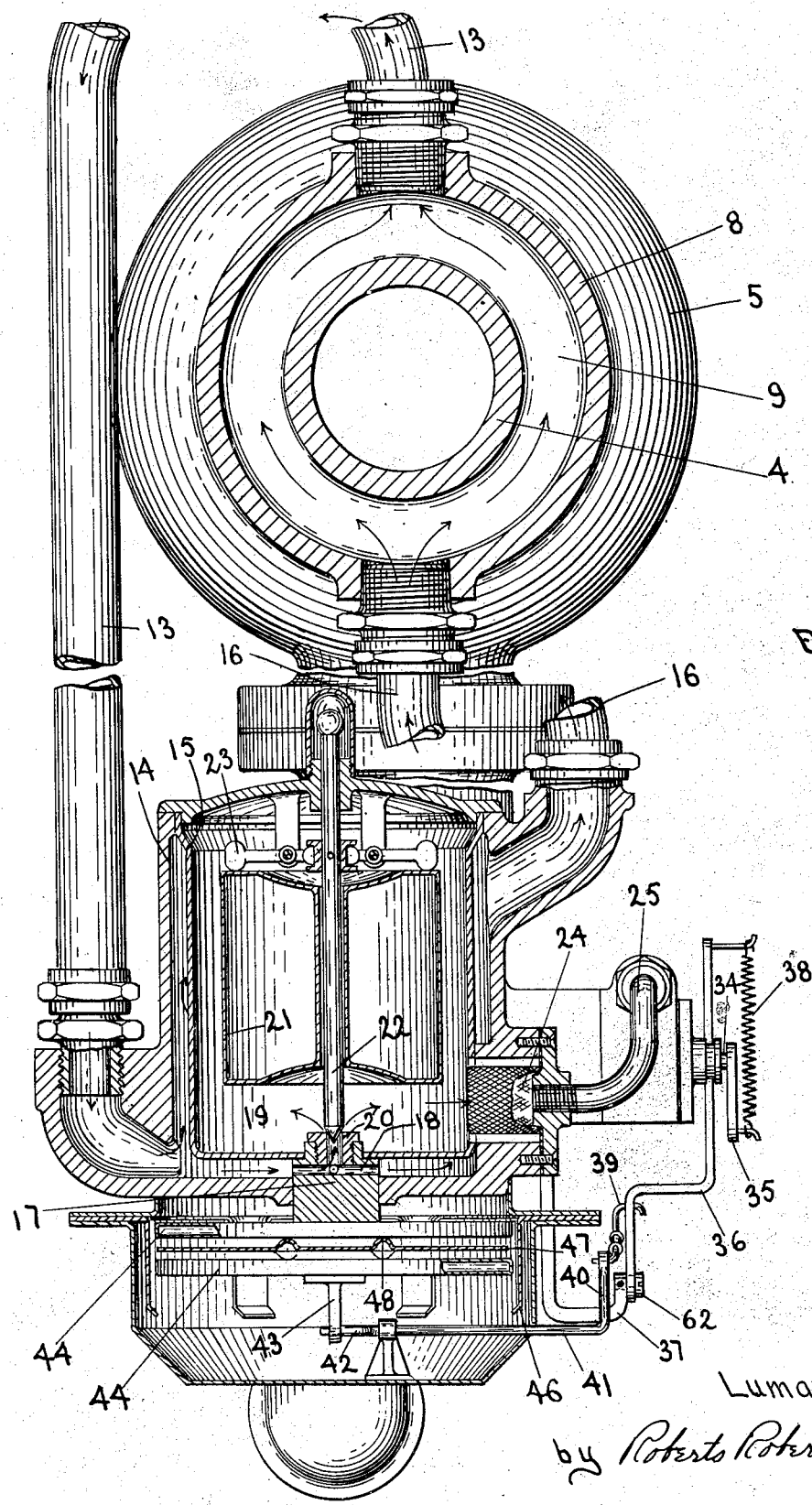
Fig. 3 is a vertical section on the line 3—3 of Fig. 2.
Figure 4:
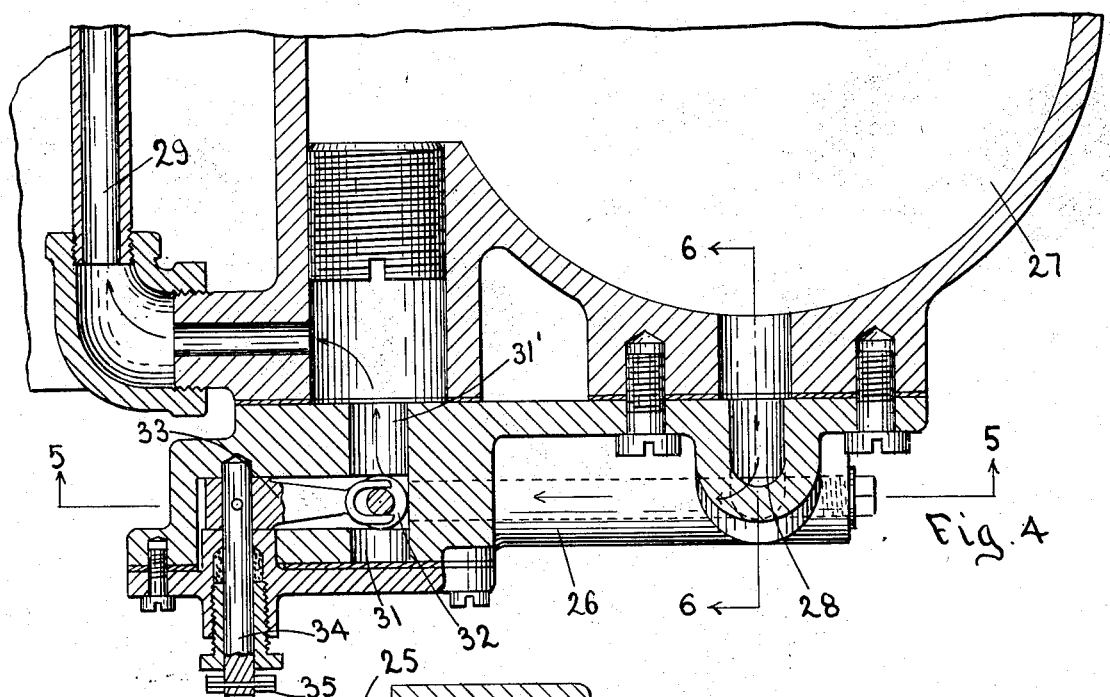
Fig. 4 is an enlarged fragmentary sectional view on the line 4—4 of Fig. 2.
Figure 5:
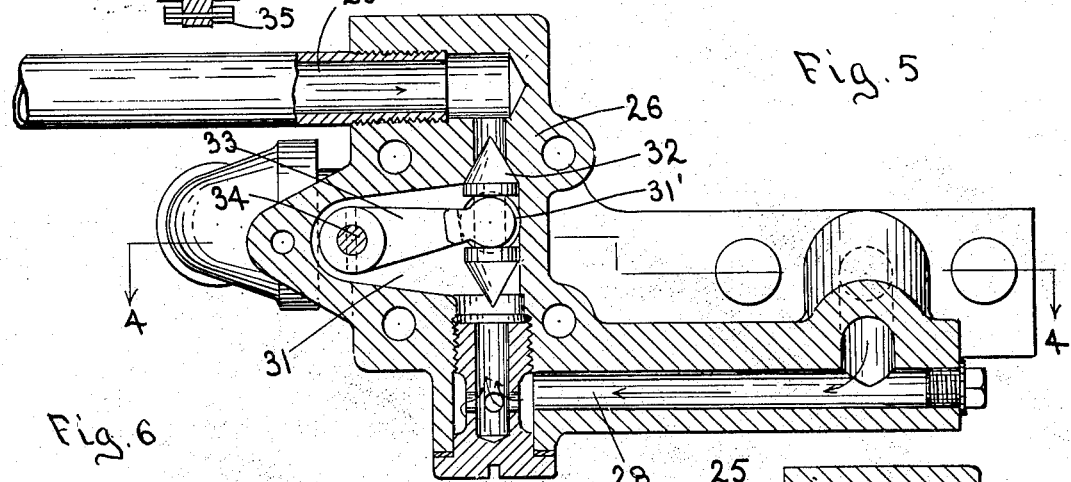
Fig. 5 is a sectional view on the line 5—5 of Fig. 4.
Figures 6, 7:
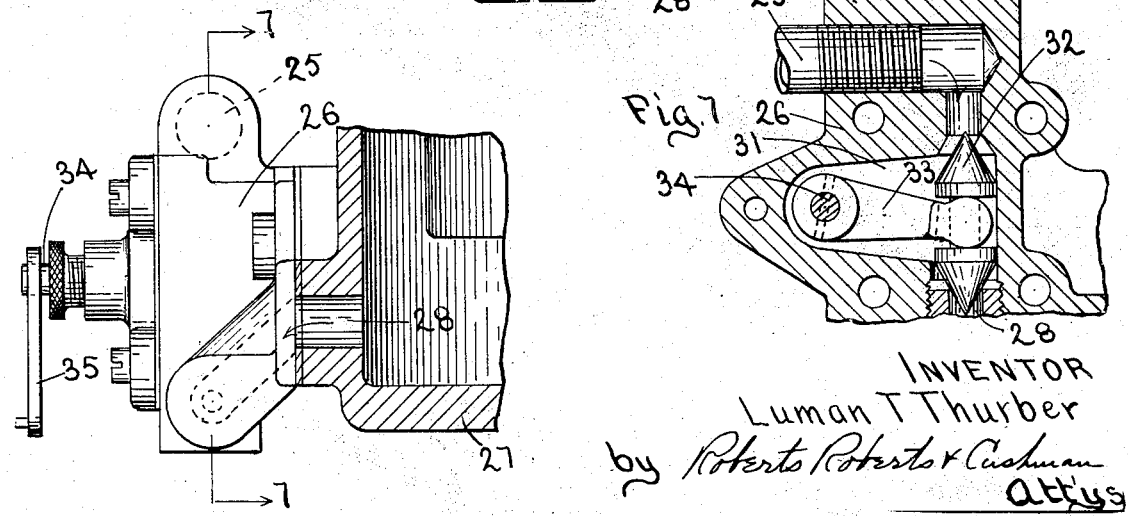
Fig. 6 is a fragmentary sectional view on the line 6—6 of Fig. 4.
Fig. 7 is a fragmentary sectional view similar to Fig. 5, illustrating a different valve position.

In Figs. 1 to 7 the first embodiment of the invention is shown as applied to an engine 1 having the usual manifold comprising an exhaust portion 2 and an intake portion 3. Connected to the exhaust manifold is a casting comprising a curved inlet portion 4, a spherical chamber 5 and an integral jacket 8 surrounding a part of the portion 4, the jacket 8 providing a fuel heating chamber 9 (Figs. 2 and 3). This casting is connected to an exhaust pipe 7 through the coupling 6. The intake manifold 3 communicates with the air inlet 69 (Fig. 1) controlled by the usual throttle valve 60 through a conduit 61 (Fig. 2) extending axially through the spherical chamber 5 and through the mixing chamber 30.

The kerosene or other heavy fuel is supplied to the heating chamber 9 from the vacuum tank 10 having an inlet 12 and outlet 11, the pipe 11 entering the chamber 9 at the top as shown in Figs. 1 and 2. The kerosene float-chamber 14 is jacketed as shown in Fig. 3 and the jacket is connected to the heating chamber 9 through the pipe 13 (Fig. 1) which connects with the top of the heating chamber and the bottom of the jacket of the float-chamber. Extending between the jacket of the float-chamber and the heating chamber is another pipe 16 which connects with the upper part of the jacket (Figs. 2 and 3) and with the bottom of the heating chamber (Figs. 1 and 2). The pipes 13 and 16 together with the heating chamber and float jacket chamber constitute a circuitous path about which the kerosene may circulate continuously on the thermo-siphon principle due to the heat supplied to the kerosene in the chamber 9, the fuel passing downwardly through pipe 13 and upwardly through pipe 16 as indicated by the arrows in Fig. 3.

The kerosene reservoir 19 (Fig. 3) communicates at the bottom of the float-chamber with the jacket space between outer and inner walls 14 and 15 through four radial passages 18 in plug 17 and thence through valve seat 20. Needle valve 22 which cooperates with the valve seat 20 is controlled by float 21 through levers 23 in the usual way. Kerosene passes from the float-chamber 19 to the mixing chamber 30 (Figs. 1 and 2) through strainer 24 (Fig. 3) pipe 25 (Figs. 2, 3, 5, 6 and 7) thence into valve chamber 31 (Figs. 4, 5 and 7) thence through outlet 31′ to the pipe 29 (Figs. 2 and 4) which leads to the mixing chamber 30. Gasoline or other relatively light fuel may be supplied to the mixing chamber from the float-chamber 27 through passageway 28 (Figs. 4, 5 and 6) to the valve chamber 31 and thence through outlet 31′ and pipe 29 as in the case of the kerosene. As shown in Figs. 2, 4, 5 and 6 passageway 28 and valve chamber 31 are located in a casting 26 which is mounted upon the side of the float-chamber casting with machine screws.

The flow of kerosene or gasoline is controlled by a double valve 32 in the valve chamber 31, the valve being carried by arm 33 pivoted on shaft 34 which is rotated by means of an outside arm 35 (Figs. 2, 3, 4 and 6). When the valve 32 is in upper position as show in Fig. 5 kerosene is excluded from the chamber 31 and gasoline is admitted through the passageway 28; and when the valve is in the lower position shown in Fig. 7 gasoline is excluded and kerosene admitted.

The valve arm 35 is connected to an arm 36 through a spring 38 (Figs. 2 and 3), the arm 36 being pivoted to a bracket 37 at 62. The arm 36 moves between the full-line and dotted-line positions shown in Fig. 2; in the full-line position the valve arm 35 is swung in a counter-clockwise direction shutting off the kerosene and when the arm 36 is in the dotted-line position the valve arm 35 is swung in a clockwise direction shutting off the gasoline. This valve arm may be controlled either manually or automatically or both as will be described hereinafter, but in this embodiment I have only illustrated an automatic control.

The automatic control for the valve comprises a thermostat located in the bottom of the kerosene float-chamber. The particular thermostat shown in Fig. 3 comprises two hollow disks 44 separated by an indented spacer disk 47 and movable vertically in guides 46. The upper disk 44 bears against the bottom of the plug 17 and the lower disk bears against a connector 43 connecting with the crank-arm 42 of the shaft 41 which extends outside the float-chamber casing and carries at its outer end a crank-arm 40. The arm 40 is connected with the arm 36 through an adjustable link 39 (Figs. 2 and 3) and a tensioning spring 50 acting on the crank-arm 40 (Fig. 2) presses the connector 43 upwardly against the lower thermostatic disk 44. Heat from the kerosene in the float-chamber 14 causes the thermostatic disks to expand and when the temperature has reached the desired point the valve 32 is snapped from the position shown in Fig. 5 to the position shown in Fig. 7 thereby shutting off the gasoline and admitting the kerosene to the mixing chamber. Obviously, the mechanism may be adjusted to operate at any desired temperature so that after the engine is started on gasoline the valve will automatically shift to kerosene when the exhaust gases have heated the kerosene in the circuit 9—13—14—16 to the desired temperature.

In order to provide for the expansion of the kerosene in the heating chamber 9 and to vent any vapor that may be formed in this chamber, the heating chamber is connected through pipe 52 (Fig. 1) with a vent chamber 53 from which kerosene may flow through a pipe 54 to the main kerosene tank.

In the embodiment shown in Figs. 9 to 15 the engine manifold (Figs. 9, 10 and 12) is provided with exhaust ports 92 and intake ports 91 and connected to the manifold at 86′ is a casting comprising the vertical portion 94 through which the exhaust gases pass downwardly and a lateral branch 86 through which the fuel mixture flows to the intake ports 91 through the passageway 87 and 89 (Figs. 12 and 13). Surrounding the vertical portion 94 is an integral jacket forming an annular fuel heating chamber 96. Fuel is supplied to this chamber through pipe 98 and the chamber is vented through pipe 101 (Figs. 8, 9, 10 and 12). This heating chamber is provided with an opening 104 on the outer side (Figs. 12 and 14) and the carbureter casting is mounted over this opening at the joint 102 (Fig. 14), the joint preferably being of the conical type as illustrated. The carbureter casting comprises a kerosene float-chamber 107, gasoline float-chamber 137 and a mixing chamber 82. All of these chambers are cast integrally together, the chambers 82 and 107 being integrally connected at 164 and 163 (Figs. 8 and 15). The upper end 83 of the mixing chamber 82 is connected to the end 85 of the aforesaid portion 86 (Fig. 10). Air is introduced into the mixing chamber through the air intake 80 (Figs. 8, 9 and 10) and the lower portion 81 (Fig. 9) of the carbureter casting.

The kerosene float-chamber 107 is provided with a double wall thus forming a jacket chamber 108 which communicates with the heating chamber 96 through the opening 104 (Figs. 12 and 14). Extending horizontally across the chamber 108 is a rib 108′ which divides the chamber into upper and lower parts, the two parts communicating through opening 165 (Figs. 9 and 14) and through the heating chamber. Thus the fuel circulates through the heating chamber and through the jacket of the float-chamber in the direction indicated by the arrows in Fig. 14, thereby heating the float-chamber and maintaining a considerable supply of heated fuel at all times. Fuel flows from the jacket chamber 108 into the float-chamber through passageway 115 (Fig. 14) controlled by needle valve 105 which in turn is controlled by the float 100. Heated kerosene flows from the float-chamber to the mixing chamber through a duct 116 (Figs. 8, 11 and 15) thence through valve chamber 119 and thence through duct 124 (Figs. 10 and 11).

Gasoline flows from the float-chamber 137 through the duct 140 (Figs. 8 and 11) to the valve chamber 119 and thence through duct 124 to the mixing chamber. A valve 121 mounted on arm 122 (Fig. 11) which is pivoted at 123 controls the kerosene and gasoline outlets 118 and 141 to the valve chamber 119, the kerosene being shut off when the valve is rotated in a counter-clockwise direction to the position shown in Fig. 11 and the gasoline being shut off when the valve is rotated in a clockwise direction. The valve shaft 123 is controlled by the three-arm member 114 (Fig. 8) on the outside of the valve chamber. The upper arm is connected through spring 151 to lever 147 pivoted at 148 and normally resting against a stop 149. The lower arm of member 114 is connected with the choke control through arm 162, spring 161 and arm 158 mounted on the lower end of the choke valve shaft, this valve being controlled in the usual way through arm 156 and a connection 159 leading to the instrument board (Figs. 8 and 9). A cam lever 157 may also be associated with the choke to adjust the valve. The horizontal arm of member 114 (Fig. 8) is connected through the spring 113 to the lever 112 which is connected at its opposite end through pin 109 to a thermostatic disk 111. This disk, which is preferably of the concavo-convex bimetallic type disclosed in the patent to Spencer No. 1,448,240, is mounted in the lower portion of the jacket chamber 108 so that it is immersed in the heated fuel, openings through the disk being provided as shown in Fig. 8 to permit the fuel to flow therethrough and equalize the pressure on opposite sides of the disk. The thermostatic disk is so constructed that it normally cups downwardly in the middle and when heated to a predetermined temperature suddenly snaps upwardly to a position wherein it is cupped upwardly in the middle. Thus in the normal position of the thermostat shown in Fig. 8 the valve 121 is held in the position shown in Fig. 11 wherein gasoline is admitted to the mixing chamber and the kerosene is shut off. However, after the engine is started and the kerosene in the float-chamber becomes heated to the desired temperature the thermostatic disk 111 snaps upwardly thereby shifting the valve to its lower position (Fig. 11) whereupon the gasoline is shut off and heated kerosene is admitted to the mixing chamber. The springs 113, 151 and 161 acting on the three arms of the member 114 are so tensioned that actuation of either lever 147 or the choke will swing the valve to the gasoline position independently of the position of the thermostat.

Owing to the continuous circulation of heated fuel around the kerosene float-chamber, the reservoir of kerosene within the float-chamber is maintained in proper condition for delivery to the mixing chamber. Owing to the close juxtaposition and direct connection between the exhaust casting 94 and the carbureter casting, the latter heats up quicker and is more easily maintained in heated condition. The thermostat is immersed in the heated fuel and is therefore quickly responsive to change in the temperature of the fuel. All of the conduits for the heated fuel are inside the associated casting so that substantially no chilling takes place as in apparatus where the heated fuel is conducted through exposed pipes.

I claim

1. Apparatus for supplying fuel to a device comprising reservoirs for relative light and heavy fuels respectively, means for conducting either kind of fuel to said device, means for heating the heavy fuel, and means responsive to the temperature of the heavy fuel for selectively connecting said reservoirs to said device.

2. Apparatus for supplying fuel to a device comprising reservoirs for relative light and heavy fuels respectively, means for conducting either kind of fuel to said device, means for heating the heavy fuel, means responsive to the temperature of the heavy fuel for selectively connecting said reservoirs to said device, and manual means for selectively connecting said reservoirs to said device independently of the temperature of the heavy fuel.

3. In apparatus for supplying fuel to a device of the type having a choke, reservoirs for relatively light and heavy fuels respectively, means for conducting either kind of fuel to said device, means for heating the heavy fuel, means responsive to the temperature of the heavy fuel for selectively connecting said reservoirs to said device, and means associated with said choke for selectively connecting said reservoirs to said device independently of the temperature of the heavy fuel.

4. In apparatus for supplying fuel to a device of the type having a choke, reservoirs for relatively light and heavy fuels respectively, means for conducting either kind of fuel to said device, means for heating the heavy fuel, and means associated with said choke for selectively connecting said reservoirs to said device.

5. In a fuel feeding and preheating device for an internal combustion engine, a supply tank for a relatively volatile fuel, a supply tank for a less volatile fuel, a heat exchanger for preheating said less volatile fuel, and a valve, said valve controlling the feed of said fuels to the mixing chamber and governed respectively by manually controlled means, by operation of the choke mechanism of said engine and by a thermostat operated by the temperature of said less volatile fuel.

6. A fuel feeding device for internal combustion engines comprising a supply of relatively volatile fuel, a supply of less volatile fuel, means for automatically disconnecting one supply from the engine and connecting the other supply to the engine, choke mechanism, and means controlled by the choke mechanism for connecting said first supply to the engine independently of said means.

7. A fuel feeding device for internal combustion engines comprising two sources of fuel supply, choke mechanism, and means controlled by the choke mechanism for selectively connecting one of said sources to the engine.

8. A fuel feeding device for internal combustion engines comprising a supply of relatively volatile fuel, a supply of less volatile fuel, means for preheating the less volatile fuel, and thermostatic control means governed by the temperature of the less volatile fuel supply for selectively admitting said fuels to said engine.

9. Apparatus of the class described, comprising two float chambers, valves for controlling the flow from each float chamber, a conduit for exhaust gases, means for transferring heat from the conduit to one of the float chambers, and means responsive to the temperature of fuel in said one of the float chambers for concomitantly opening one of the valves and closing the other.

Signed by me at Boston, Massachusetts this 14th day of September, 1923.

LUMAN T. THURBER.